United States Patent [19]

Chapman

[11]  4,456,278
[45]  Jun. 26, 1984

[54] TRAILER TOWING DEVICE

[76] Inventor: T. Walton Chapman, Chapman Equipment Sales, R.D. 1, Box 105, DuBois, Pa. 15801

[21] Appl. No.: 366,282

[22] Filed: Apr. 7, 1982

[51] Int. Cl.³ .............................................. B60P 3/06
[52] U.S. Cl. ................... 280/402; 280/433; 414/563
[58] Field of Search .......... 280/433, 432, 402, 415 R, 280/415 A, 415 B, 480; 414/563

[56] References Cited

U.S. PATENT DOCUMENTS

| | | | |
|---|---|---|---|
| 1,908,704 | 5/1933 | Hamren | 280/491 A |
| 1,939,863 | 12/1933 | Seiter | 280/80 |
| 2,661,106 | 12/1953 | Morgan | 414/563 |
| 2,793,770 | 5/1957 | St. Denis | 414/563 |
| 2,867,451 | 1/1959 | Repke | 280/479 |
| 3,325,185 | 6/1967 | Higby | 280/432 |
| 3,659,873 | 5/1972 | Gewalt | 280/415 A |
| 3,715,042 | 2/1973 | Rellinger | 414/563 |
| 3,767,069 | 10/1973 | White et al. | 280/402 |
| 4,149,643 | 4/1979 | Skala et al. | 414/563 |
| 4,152,006 | 5/1979 | Dunlap | 280/402 |
| 4,201,399 | 5/1980 | Carr et al. | 280/402 |

Primary Examiner—John A. Pekar
Attorney, Agent, or Firm—Perry J. Saidman; Robert G. Sterne; Edward J. Kessler

[57] ABSTRACT

A device for supporting and towing a trailer includes a first part engageable with the kingpin of the trailer, a second part engageable with an edge portion of the trailer, and a pair of tension members extending from the first part past the second part at spaced positions therealong, and secured to a supporting or towing vehicle.

7 Claims, 3 Drawing Figures

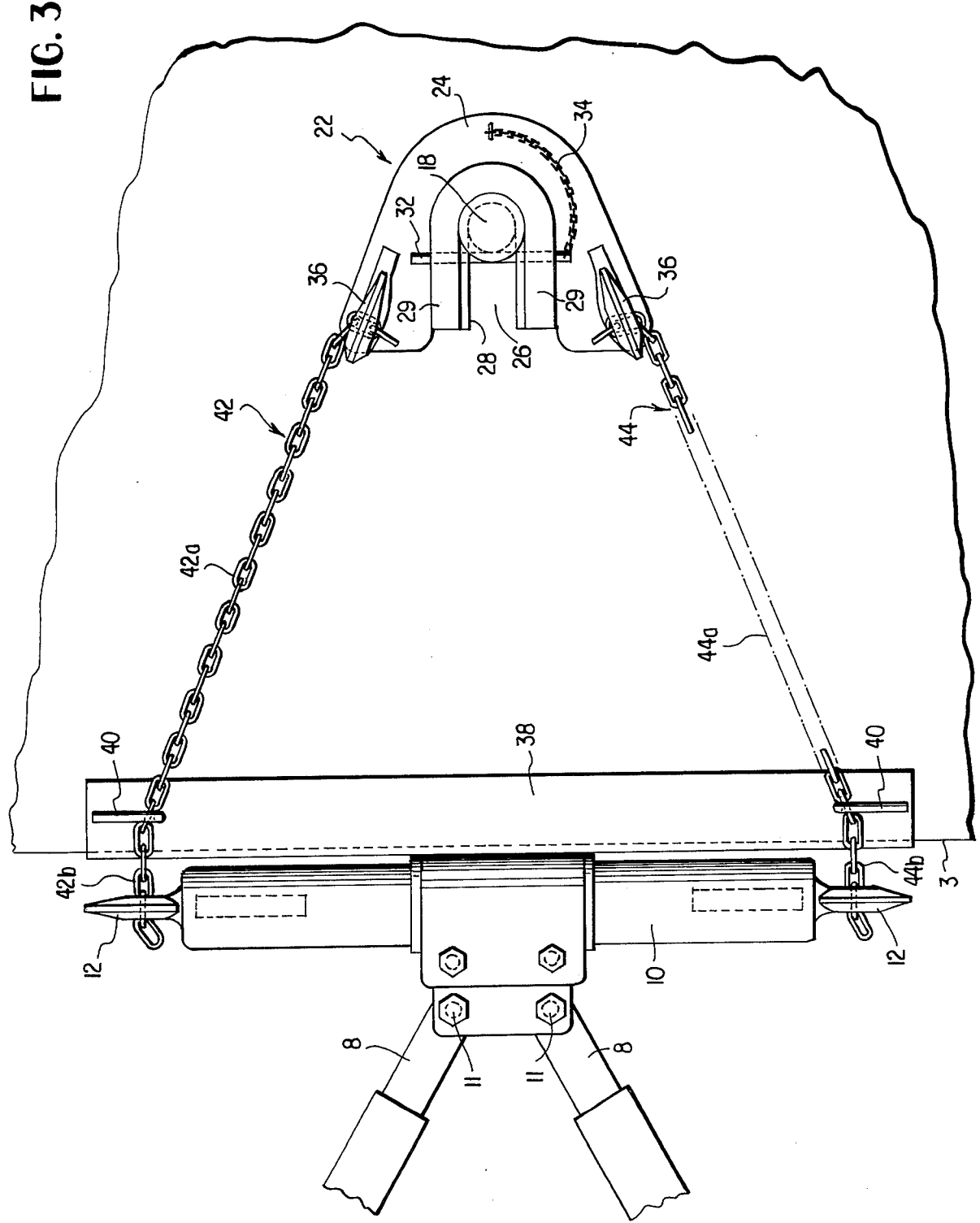

TRAILER TOWING DEVICE

BACKGROUND OF THE INVENTION

1. Field of the Invention

The invention relates to apparatus for lifting and towing a vehicle, such as a trailer equipped with a kingpin, of the type normally towed by a tractor equipped with a fifth wheel coupling.

2. Discussion of the Related Art

Kingpin-equipped trailers are designed to be towed by a tractor equipped with a hitchplate which receives the kingpin, thus coupling the trailer to the tractor. At times, it becomes necessary to tow such a trailer when a tractor is unavailable or disabled due to mechanical breakdown or other mishap. It may also be desirable to move trailers in storage or during loading and unloading operations when a tractor is not conveniently available.

Conventional trailers normally have wheels proximate the rear portion thereof, and adjustable legs or supports near the front end of the trailer. The legs support the front end of the trailer when it is not coupled to a tractor, and will be adjusted at such times to position the trailer at a height and in such manner that a tractor may be easily maneuvered under the trailer and into position for coupling.

At times, it will happen that a trailer will be positioned in such manner that it is not possible to position the coupling plate of the tractor under the kingpin of the trailer in the usual manner. For example, following accidental decoupling of a trailer from its tractor, the trailer will be oriented in a random position. If it is standing upright, the front portion of the trailer will be at an insufficient elevation to permit the trailer to be recoupled to the tractor. If the trailer is inclined to a significant degree with respect to the horizontal, it may be virtually impossible to recouple the trailer even if the front end of the trailer is sufficiently elevated. Similar problems occur when a trailer in storage shifts from its proper recoupling position due to insufficient support under the front support legs of the trailer.

Various slings, jacks, and other lifting or towing devices have been proposed for use in situations as described above. However, most are cumbersome, difficult to attach, and often dangerously unstable in use. Also, many jacking devices cannot be used at all if the trailer is awkwardly positioned or if the base of the jack cannot be adequately supported.

U.S. Pat. No. 3,659,873 to Gewalt discloses a device which alleviates several problems associated with previously known lifting and towing devices for kingpin-equipped vehicles. The patented device comprises an elongated rigid bar having means on one end for sliding over and seating upon the kingpin of a trailer. The other end of the bar includes a lifting loop to which a tow truck cable may be attached. As the bar is lifted by the cable, a load distributing plate attached to the bar contacts an edge portion of the vehicle. The Gewalt device will apparently satisfactorily lift a trailer in many situations. However, several significant drawbacks are associated with the device.

Initially, the Gewalt towing bar is rather large and heavy, comprising an I-beam of substantial length and a load distributing plate fastened across the I-beam. This makes it difficult to store in a towing vehicle or to handle easily during use.

Because of the substantial length and rigidity of the Gewalt tow bar, substantial ground clearance under the front end of the trailer is required in order to install the device. Ground clearance at least several times the vertical dimension of the tow bar would apparently be required in order to properly position the bar under the trailer and attach it to the kingpin in the manner disclosed in the patent.

Installation of the tow bar disclosed by Gewalt apparently requires two persons. Because the device is not securely fastened to the kingpin, and because the axis of the I-beam must be positioned substantially along the axis of the trailer, it appears that the bar must be manually held in position while the tow truck operator raises the cable to lift the trailer. Additionally, it appears that the substantial weight and length of the device would make it difficult, at best, for a lone individual to attach the tow bar to a trailer kingpin, especially if there is limited ground clearance beneath the front end of the trailer. The Gewalt tow bar includes fingers which must be passed around the reduced diameter section of the kingpin. The vertical height of these fingers is substantially equal to the vertical height of the reduced diameter section. Therefore, the tow bar must be substantially parallel to the lower surface of the trailer for the tow bar to be maneuvered into position on the kingpin. This may be difficult to accomplish due to the weight of the device, especially if the operator must manipulate the tow bar from a prone position when ground clearance is limited.

Once attached, the Gewalt towing bar is held in place only by the weight of the trailer, and can be shifted or even dislodged as a result of shock and vibration caused by, for example, road bumps. A trailer towed in the manner taught by Gewalt is suspended only from a single cable, and is thus supported in an unstable manner. Nothing prevents the trailer from shifting laterally with respect to the towing vehicle or from tipping over to either side. Also, the trailer may shift in a forward or rearward direction with respect to the towing vehicle due to acceleration and deceleration forces.

While the Gewalt tow bar may satisfactorily lift a trailer which is properly positioned in a substantially horizontal plane, if the trailer is leaning substantially to either side, the bar is likely to slip with respect to the trailer or lifting thereby may even cause the trailer to tip over.

Accordingly, it is an object of the present invention to overcome the drawbacks associated with previously known trailer lifting and towing devices.

An object of the invention is to provide means for safely supporting and towing a trailer without a tractor.

It is a further object of the invention to provide means for towing a trailer which can be installed easily by a single operator without assistance.

An object of the invention is to provide towing means which may be securely and safely attached to a trailer in such fashion that it cannot be dislodged during use.

A further object of the invention is to provide towing means which is small, light, and easily manipulated, yet is capable of accommodating significant loads.

An object of the invention is to provide towing means which may be readily affixed to trailers of varying size and configuration.

SUMMARY OF THE INVENTION

In one of its aspects, the invention comprises apparatus for towing a trailer having a pin adapted to couple the trailer to a towing vehicle, the apparatus comprising first means adapted to engage the pin of the trailer, second means adapted to engage a portion of the trailer remote from the pin, and flexible means extending between the first and second means. The flexible means comprises a portion extending beyond the second means and adapted to be attached to a towing vehicle.

The first means preferably comprises a plate adapted to engage the pin, and means for securing the flexible means to the plate. The plate may be U-shaped having a slot therein for engaging the pin. The plate may also comprise means, which may extend across the slot, for securing it to the pin.

The second means is adapted to engage an edge portion of the trailer, and may be L-shaped in cross-section. The second means comprises an elongated member adapted to engage the trailer along at least a substantial portion of the length of the member. The flexible means preferably comprises two flexible members extending between the first means and the elongated member, the elongated member comprising means for maintaining the flexible members spaced from each other. The plate is rotatable on the pin whereby the tensions in the flexible members may be equalized. A portion of each flexible member extends beyond the elongated member and is adapted to be attached to a towing vehicle.

In another of its aspects, the invention comprises means for towing a trailer which has a pin for coupling the trailer to a towing vehicle, the means comprising a U-shaped plate adapted to be mounted on the pin, means associated with the plate for attaching a pair of flexible members to the plate, an elongated member adapted to engage an edge portion of the trailer, means associated with the elongated member for spacing the flexible members from each other, the flexible members each comprising a first portion extending from the attaching means of the plate to the spacing means of the elongated member, and a second portion extending beyond the elongated member and adapted to be attached to a towing vehicle.

BRIEF DESCRIPTION OF THE DRAWINGS

The above objects and features will be best understood in view of the description hereinafter of a preferred embodiment, taken together with the accompanying drawings in which:

FIG. 3 is a bottom view of a device in accordance with the invention secured to a trailer and attached to a towing vehicle.

DETAILED DESCRIPTION OF THE PREFERRED EMBODIMENT

Figure 1:
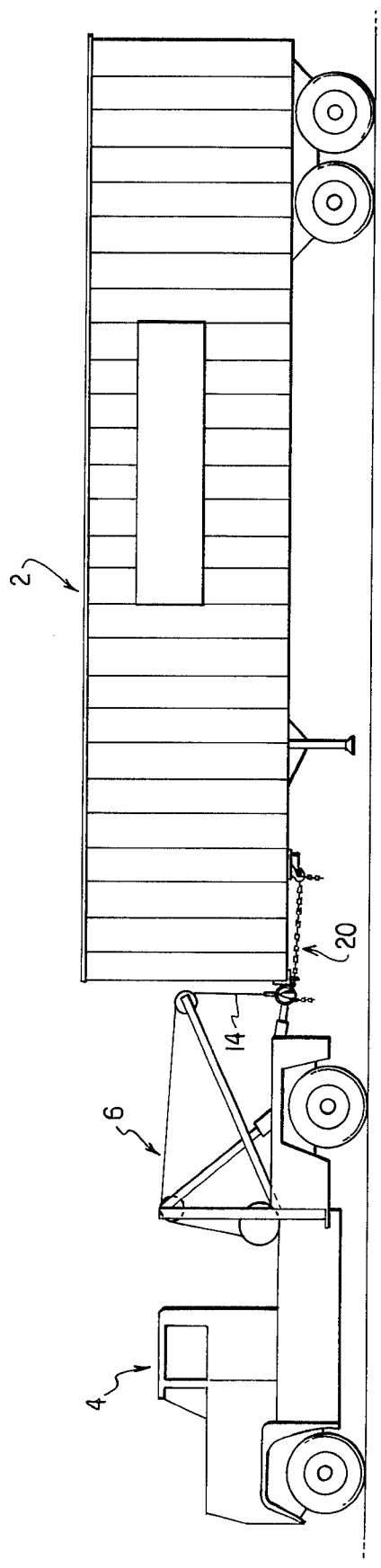
FIG. 1 is a side view of a towing vehicle using a device in accordance with the present invention to support a trailer.

Referring to FIG. 1, a trailer of conventional structure, generally designated by reference numeral 2, is supported by a towing vehicle 4 using means in accordance with the present invention, generally designated by reference numeral 20.

Figure 2:
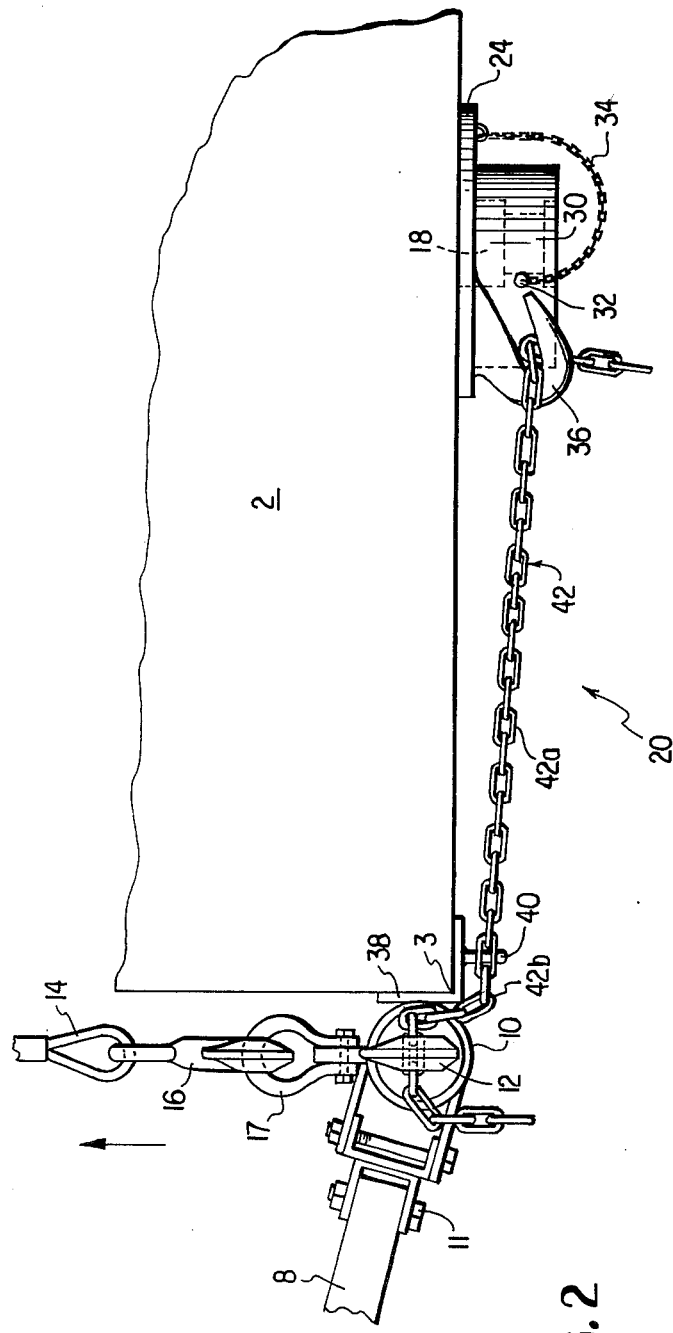
FIG. 2 is an enlargement of a portion of FIG. 1, illustrating in greater detail features of the present invention.

The lifting means 6 associated with vehicle 4 is of conventional structure, including a pair of struts 8, as best seen in FIGS. 2 and 3, affixed to the rear of towing vehicle 4. Struts 8 stabilize and maintain trailer 2 at a fixed distance from vehicle 4. A cross bar 10 is pivotally secured to each strut 8 by a pair of pivots 11. Struts 8 are also pivotally attached to the rear of towing vehicle 4, permitting cross bar 10 to pivot with respect to vehicle 4. A pair of hooks 12 on opposite ends of bar 10 receive chains or cables for attaching trailer 2 to towing vehicle 4. A lifting cable 14 having a hook 16 thereon may be attached to an eyelet 17 when it is necessary to lift bar 10 and trailer 2 secured to it. Alternatively, when a vehicle is to be towed, for example, in the manner taught by U.S. Pat. No. 3,659,873 discussed hereinabove, hook 16 may be attached directly to a towing device or to the vehicle to be towed.

As best seen in FIGS. 2-3, trailer 2 comprises a kingpin 18 which is normally used to couple the trailer to a tractor. Kingpins are of standard dimensions and configuration, having a reduced diameter portion 30 (FIG. 2).

The present invention includes a plate, generally designated by reference numeral 22. Plate 22 includes a top portion 24 adapted to engage the underside of trailer 2 at the portion thereof surrounding pin 18. Plate 22 is generally U-shaped, having a slot 26 adapted to receive pin 18 therein. Slot 26 is of a width slightly larger than the diameter of pin 18 so that the pin may be slidably received within the slot. An inwardly extending ridge 28 extends around the interior surface of slot 26, and is adapted to slidably receive reduced diameter portion 30 of pin 18.

The invention further includes a locking or retaining means in the form of a rod 32 adapted to extend across slot 26. Rod 32 extends through apertures in side portions 29 of plate 22 in a position closely adjacent to reduced diameter portion 30, whereby plate 22 cannot shift relative to pin 18 to an appreciable extent, whereby the plate cannot be dislodged or disengaged from the pin. For convenience, a chain 34 attaches rod 32 to plate 22.

Plate 22 includes a pair of hooks 36 positioned on opposite sides of slot 26. Hooks 36 are of a heavy duty variety adapted to retain therein a cable or chain.

The apparatus of the present invention also includes a spreader bar 38 having thereon a pair of projections 40 for a purpose to be described in greater detail hereinafter. Spreader bar 38 is preferably L-shaped in cross-section, as best seen in FIG. 2, and, in use, engages the edge 3 of trailer 2.

The present apparatus further includes first and second flexible tension-bearing elements 42 and 44, such as the chains illustrated in the Figures. Chains 42 and 44 are secured to hooks 36, and comprise first portions 42a and 44a, respectively, extending between plate 22 and spreader bar 38. Chains 42 and 44 pass on opposite sides of projections 40 of spreader bar 38, which maintain chains 42 and 44 spaced from each other. If desirable, projections 40 may be secured to spreader bar 38 in such manner that the spacing therebetween is adjustable. Chains 42 and 44 further comprise second portions 42b and 44b, respectively, which extend beyond spreader bar 38 and are adapted to be attached to hooks 12 of the towing vehicle.

To install the device of the invention, plate 22 is first slipped onto pin 18 of the trailer. Rod 32 is inserted to lock plate 22 onto the pin. Chains 42 and 44 are then attached to hooks 36. The other ends of chains 42 and 44 are attached to hooks 12 of the towing vehicle, the bar 10 of which has been brought to a position closely adjacent front edge 3 of the trailer. At this point, chains 42 and 44 extend between hooks 12 and 36 with some slack. Spreader bar 38 is then positioned atop chains 42 and 44 just below trailer edge 3. Spreader bar 38 is positioned on the chains with projections 40 between the chains, in the manner illustrated, thereby spacing the chains from each other in the region of edge 3 of the trailer.

The operator then raises cable 14 and hook 16, thereby raising bar 10 and applying tension to chains 42 and 44. Spreader bar 38 is brought into contact with the front edge 3 of the trailer, thereby distributing the weight of the trailer over the entire length of bar 38. Tension in chains 42 and 44 causes the trailer to abut against bar 10 of the towing vehicle. Chains 42 and 44 are free to slide past projections 40 of spreader bar 38, and plate 22 is free to pivot or rotate about pin 18. Consequently, the trailer supported in the manner described will tend to assume an upright position and the tension in chains 42 and 44 will always be substantially equal.

Means in accordance with the present invention, as illustrated in the accompanying Figures, have been safely used to tow trailers having front end weights in excess of 14,000 pounds. The invention has proven to be both safe and easy to use.

Once positioned on pin 18 in the manner described, plate 22 of the invention cannot be dislodged from the pin regardless of forces or vibration to which the trailer and plate are subjected. Because chains 42 and 44 are spaced from each other by spreader bar 38 and projections 40, the trailer is supported at laterally spaced positions in a balanced fashion. Spreader bar 38 also distributes lifting force applied to the trailer across the entire bar, thus preventing damage to the trailer body.

The trailer rests securely against cross bar 10 of towing vehicle 4, and is held thereagainst by tensioned chain portions 42b and 44b. Thus, the trailer is not free to move forwardly or rearwardly in response to acceleration or deceleration forces. Also, the trailer cannot shift side to side in relation to towing vehicle 4. The support afforded by hooks 12 and chains 42 and 44 at laterally spaced positions assures that the trailer will not tip to either side when supported by the towing vehicle. Thus, when supported in the manner illustrated in the Figures, trailer 2 is completely stabilized with respect to towing vehicle 4.

The laterally spaced points of application of lifting forces is especially advantageous when the trailer to be lifted is leaning to one side. The forces applied by chains 42 and 44 at positions spaced on opposite sides of the trailer's center of gravity will tend to right the trailer to a vertical position as it is lifted. This cannot be accomplished by devices, known in the prior art, which apply a lifting force only at a single point.

While functionally superior to devices known in the prior art, the present invention is substantially lighter and more compact than prior art devices, and fits easily into a truck toolbox. Chains 42 and 44 are standard items normally found on tow trucks and the like, which further reduces the space required to store the present invention. It should be understood that, while chains 42 and 44 are shown as individual lengths, they could comprise opposite end portions of a single chain.

The present invention provides balanced, stable lifting forces and support for trailers and similar vehicles in a manner far superior to devices known in the prior art. Additionally, because it comprises separable elements which are assembled during use, the device may be readily adjusted to fit trailers and vehicles having varying dimensions and configurations. Spreader bar 38, while illustrated as a linear element adapted to engage the straight front edge portion of standard trailers, may also have a specialized configuration suitable for engaging trailers or vehicles having other configurations. The distance between projections 40 may also be varied to accommodate trailers or towing vehicles of varying dimensions. Plate 22 of the present invention fits all standard kingpin couplers.

One person can easily install and use the apparatus of the invention. Installation requires only sufficient ground clearance for an operator to reach under the trailer and attach the small and relatively light plate 22 and a minimal amount of clearance permitting passage of chains 42 and 44 under front edge 3 of the trailer. Thus, a trailer which has its underside almost resting on the ground may still be lifted safely and easily using the device of the present invention.

Once lifted and held in position against the towing vehicle in the manner described, the stable connection between the vehicle and trailer enables the trailer to be towed easily and safely. The articulable connection between the towing vehicle and its cross bar 10 enables the towing vehicle and the trailer to be driven in the same manner as a conventional tractor-trailer combination would be driven. Thus, if necessary, a trailer may be towed in the manner described hereinabove with great safety for a substantial distance and at reasonable speeds.

While the invention has been described with respect to the accompanying drawings, it should not be considered to be limited to the details shown therein as obvious modifications may be made by persons of ordinary skill in the art, the invention being limited only by the scope of the claims appended thereto.

I claim as my invention:

1. Apparatus for towing a trailer which has a pin for coupling the trailer to a towing vehicle, said apparatus comprising:
   a U-shaped plate adapted to be mounted to the pin;
   a pair of flexible members;
   means associated with said plate for attaching said pair of flexible members to said plate;
   an elongated member adapted to engage an edge portion of the trailer;
   means associated with said elongated member for spacing said flexible members from each other;
   said flexible members each comprising a first portion extending from said attaching means of said plate to said spacing means of said elongated member, and a second portion extending beyond said elongated member and adapted to be attached to a towing vehicle.

2. Apparatus as set forth in claim 1, wherein said first portions of said flexible members are nonparallel.

3. Apparatus as set forth in claim 1, wherein said elongated member is L-shaped in cross-section.

4. Apparatus for coupling a trailer or like non-powered vehicle to a towing vehicle other than a tractor or other powered vehicle having a fifth wheel configuration, for simultaneously supporting and towing the trailer or like non-powered vehicle, wherein the trailer or other non-powered vehicle to be towed has pin means for normally coupling the towed vehicle to a towing vehicle having a fifth wheel configuration, said apparatus comprising:
   means for engaging said towed vehicle pin means;
   a plurality of non-parallel, flexible members coupled to said pin engaging means;

an elongated member adapted to engage an edge portion of said towed vehicle;

means for coupling said non-parallel, flexible members to said elongated member in spaced apart relation relative to each other; and means coupled to said elongated member and adapted to couple said towed vehicle to said towing vehicle at a location remote from said pin means to support said towed vehicle for towing.

5. Apparatus as set forth in claim 4, wherein said pin engaging means comprises a plate.

6. Apparatus as set forth in claim 5, wherein said plate is U-shaped.

7. Apparatus as set forth in claim 4, wherein said elongated member is L-shaped in cross-section.

* * * * *